US009575724B1

(12) United States Patent
Liberatori, Jr.

(10) Patent No.: US 9,575,724 B1
(45) Date of Patent: *Feb. 21, 2017

(54) VERIFICATION SYSTEM AND METHOD FOR A COLLECTIBLE OBJECT

(76) Inventor: Anthony C. Liberatori, Jr., Easton, PA (US)

( * ) Notice: Subject to any disclaimer, the term of this patent is extended or adjusted under 35 U.S.C. 154(b) by 711 days.

This patent is subject to a terminal disclaimer.

(21) Appl. No.: 13/323,881

(22) Filed: Dec. 13, 2011

Related U.S. Application Data

(63) Continuation-in-part of application No. 13/246,024, filed on Sep. 27, 2011, now abandoned.

(60) Provisional application No. 61/390,756, filed on Oct. 7, 2010.

(51) Int. Cl.
- *G06F 7/02* (2006.01)
- *G06F 7/00* (2006.01)
- *G06F 17/00* (2006.01)
- *G06F 17/30* (2006.01)

(52) U.S. Cl.
CPC .............. *G06F 7/02* (2013.01); *G06F 17/00* (2013.01)

(58) Field of Classification Search
CPC .............................................. G06F 2221/2129
See application file for complete search history.

(56) References Cited

U.S. PATENT DOCUMENTS

| 6,842,106 B2 | 1/2005 | Hughes et al. |
| 6,888,509 B2 * | 5/2005 | Atherton ............. G06K 19/073 235/492 |
| 7,042,357 B2 | 5/2006 | Girvin et al. |
| 7,283,054 B2 | 10/2007 | Girvin et al. |
| 7,653,625 B1 * | 1/2010 | Frankel ............... G06Q 20/401 705/75 |
| 7,982,609 B2 | 7/2011 | Padmanabhan et al. |
| 8,448,857 B2 * | 5/2013 | Davis ................ G06Q 30/0603 235/383 |

(Continued)

FOREIGN PATENT DOCUMENTS

GB    2425390 A  * 10/2006

OTHER PUBLICATIONS

Anonymous; The MedTech Group of Companies; May 12, 2008; National Post; pp. 1-4.*

(Continued)

*Primary Examiner* — Scott A Waldron
*Assistant Examiner* — Jermaine Mincey
(74) *Attorney, Agent, or Firm* — Wendy W. Koba

(57) ABSTRACT

An electronic clearinghouse allows for owners of collectible objects to store detailed information in an off-site, secure database system. A separate record is created for each object and holds various types of detailed information about the object (history, pedigree, provenance, third-party authenticity documentation, etc.). The current physical location of the collectible object may also be stored in the database record and, preferably, one or more digital images of the collectible object is also stored. An unclonable, unique RFID tag is created for each collectible object and linked to its record in the e-clearinghouse database. The RFID tag is affixed to the object and needs to store only a minimal amount of information and can therefore take the form of a "passive" RFID tag. When used with large collectibles, the tag includes a window to allow for a digital image of a portion of the collectible to be created.

8 Claims, 8 Drawing Sheets

(56) References Cited

U.S. PATENT DOCUMENTS

| | | | | |
|---|---|---|---|---|
| 8,467,631 B2* | 6/2013 | Kamay | | G06F 3/1454 382/100 |
| 2006/0290505 A1* | 12/2006 | Conwell | | G06K 19/07745 340/572.1 |
| 2007/0057050 A1* | 3/2007 | Kuhno | | G02B 27/62 235/383 |
| 2007/0075861 A1 | 4/2007 | Cook et al. | | |
| 2007/0113451 A1 | 5/2007 | McDowell et al. | | |
| 2007/0118436 A1 | 5/2007 | McDowell et al. | | |
| 2008/0023351 A1 | 1/2008 | Macor | | |
| 2008/0112596 A1* | 5/2008 | Rhoads et al. | | 382/115 |
| 2008/0115465 A1* | 5/2008 | Dickinson | | A45C 13/02 153/476 |
| 2008/0147625 A1* | 6/2008 | Altounian et al. | | 707/4 |
| 2009/0051500 A1* | 2/2009 | Nakamura | | G06Q 30/0601 340/10.41 |
| 2009/0083833 A1* | 3/2009 | Ziola et al. | | 726/2 |
| 2009/0096583 A1 | 4/2009 | Kanda et al. | | |
| 2009/0128340 A1 | 5/2009 | Masin | | |
| 2009/0224891 A1* | 9/2009 | Vishik et al. | | 340/10.41 |
| 2010/0073147 A1 | 3/2010 | Guajardo Merchan et al. | | |
| 2014/0353383 A1* | 12/2014 | Gentelet | | G06K 19/07749 235/488 |

OTHER PUBLICATIONS

Rhea Wessel; RFID Helps Malaysian Museums Track Artifacts; 2007; pp. 1-2.*

* cited by examiner

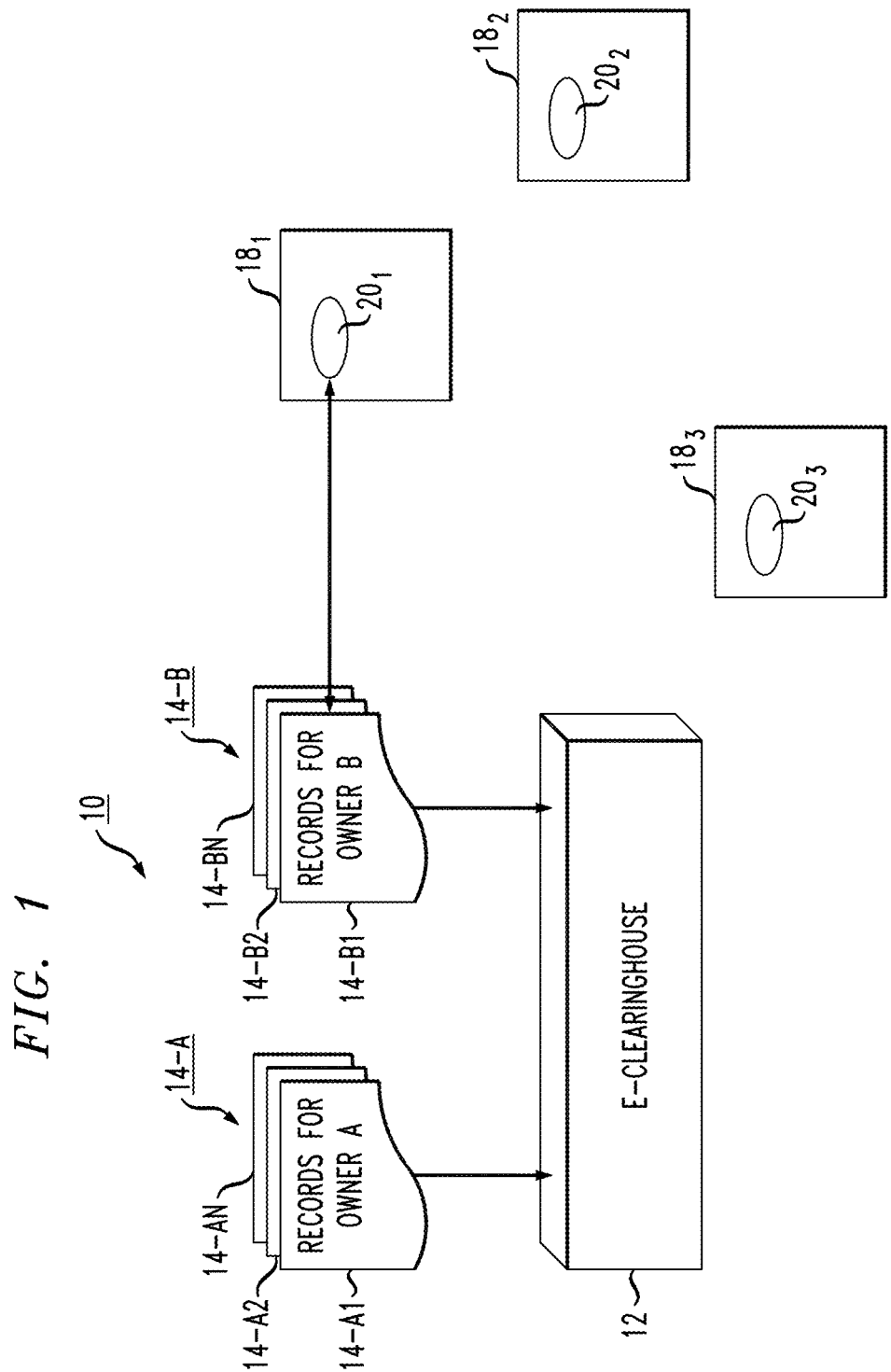

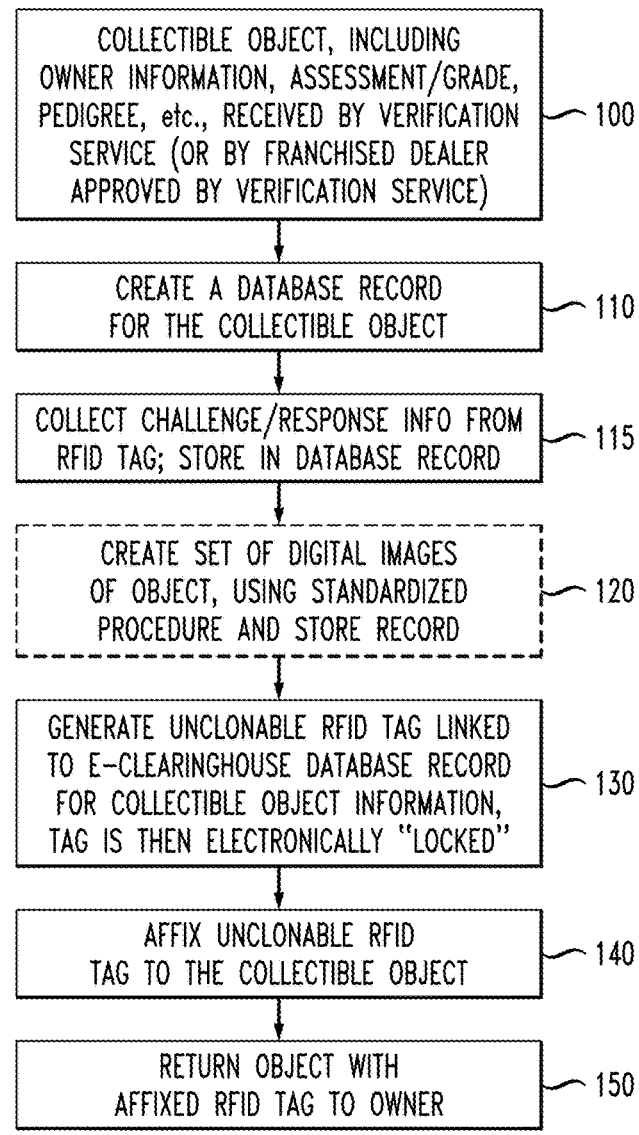

VERIFICATION SYSTEM AND METHOD FOR A COLLECTIBLE OBJECT

CROSS-REFERENCE TO RELATED APPLICATION

This application is a continuation-in-part of U.S. application Ser. No. 13/246,024, filed Sep. 27, 2011, which claims the benefit of U.S. Application No. 61/390,756, filed Oct. 7, 2010 and herein incorporated by reference.

TECHNICAL FIELD

The present invention relates to a verification system and method for a collectible object and, more particularly, to the use of unclonable RFID tagging in combination with an electronic clearinghouse facility to verify that a collectible object "under study" is the unique item that it purports to be.

BACKGROUND OF THE INVENTION

There are many businesses today that involve the buying and selling of various types of collectibles: coins, gold or silver bullion bars, art work, sports cards, memorabilia, and the like. The ability to verify that a specific item offered for sale is not a "fake" is problematic, at best. The addition of buying and selling these items over the internet has only led to an increase in untoward business practices in these areas.

There have been various attempts in the past to address these concerns. US Patent Publication 2008/0023351, entitled "Protection, Authentication, Identification Device for a Collectable Object" issued to J. J. Macor on Jan. 31, 2008 describes the utilization of a "protection, authentication, identification device" to encase a collectible object (such as a coin), where the encasement includes a "data storage device" that stores specific ID information about the collectible object. The disclosed "data storage device" may take the form of an RFID tag that holds information including a digital image of the object. An "active" RFID tag (that is, a tag including its own power supply) is required in the Macor device for the volume of information required for digital image storage. Inasmuch as the owner is also the creator of the active RFID tag, a prospective buyer must rely on the owner's integrity that the object offered for sale is indeed the "collectible" it is purported to be. Additionally, while an active RFID tag can hold a relatively large amount of data, it cannot retain a detailed "history" of information and/or a digital image of a collectible object (that is, information such as pedigree, provenance, etc.)—the particular kinds of information a prospective purchaser may be interested in reviewing prior to completing a transaction.

Thus, a need remains for providing a third-party holder of detailed information for collectible objects, where the third party is electronically accessible by both owners and prospective purchasers and allows for prospective purchasers to have a higher level of comfort about the authenticity of a collectible object prior to purchase.

Moreover, there is a need to provide a system of creating and maintaining secure and credible information associated with "large" objects that cannot be encased within an enclosure that incorporates ID information with the object. For example, it may be desired to create and maintain a database of information associated with collectible objects such as cars, paintings, furniture and household items (e.g., china, silver, pottery or the like). To date, there is no system in place that can catalogue and verify the authenticity of large pieces.

SUMMARY OF THE INVENTION

The needs remaining in the prior art addressed by the present invention, which relates to a verification system and method for a collectible object and, more particularly, to the use of unclonable RFID tagging in combination with an electronic clearinghouse facility to verify that a collectible object "under study" is the unique item that it purports to be.

In accordance with the present invention, an electronic clearinghouse (referred to hereinafter as an "e-clearinghouse") is created that allows for owners of collectible objects to store detailed information regarding each separate collectible object in his collection. The e-clearinghouse provides separate and secure storage partitions for each registered owner of collectible objects. Additionally, a separate record is created for each collectible object associated with a particular owner. The record can hold various detailed types of information about the collectible object (history, pedigree, provenance, third-party authenticity documentation, prior sales history, etc.), hereinafter defined collectively as "detailed background information". The current physical location of the collectible object may also be stored in the database record (a valuable feature for an owner with many objects stored in various physical locations).

An unclonable, unique RFID tag is created for each collectible object and linked to its record in the e-clearinghouse database. The unclonable RFID tag is affixed to the object (or to a casing of the object) and needs to store only a minimal amount of information (e.g., identity of owner, value of object, security information (challenge/response) required to access database) and can therefore take the form of a "passive" RFID tag (less expensive than an active RFID tag).

Subsequently, when an owner wishes to sell a particular collectible object, the stored information is accessed for a prospective purchaser via the unclonable RFID tag, allowing for the purchaser to confirm the authenticity of an object (and/or for verifying the appraisal authenticity) prior to concluding the transaction.

It is an aspect of the present invention that the use of an unclonable RFID tag prevents the tag and e-clearinghouse from being accessed by other than the true owner of the collectible. Preferably, the RFID tag is also created to include a tamper-resistant element that renders the RFID tag unreadable if it is attempted to be removed from the proper collectible object (preventing the switching of tags from a bona fide collectible object to a fake). One exemplary type of unclonable RFID tag that may be used in accordance with the present invention is based on "physical unclonable functions" (PUF) associated with the particular integrated circuit forming the unique RFID tag. Other means of introducing security into the RFID process may also be used.

In a preferred embodiment of the present invention, a series of digital images of the collectible object are created upon generation of the database information, the digital images also stored at the e-clearinghouse as part of the database record for that collectible object. Subsequently, a prospective purchaser can have the collectible object "scanned" using similar equipment as used to create the original digital images and have the stored images compared against the current images, again preventing the sale of "fake" collectibles if it is determined that the images do not match.

The arrangement of the present invention is contemplated to define an e-clearinghouse system for storing information related to collectible objects for a number of different owners. The collectible objects themselves may comprise a variety of different types of items that are generally collected—the objects per se are not considered to be a significant aspect of the invention; the concern is to provide a high level of integrity in the on-going business of buying and selling collectible objects of any type. Typical collectibles include, for example, coins, paintings, sports memorabilia, cars, photographs, books, etc. The aspects of the present invention as described in detail below are equally applicable to each of these types of collectibles (and any other collectible).

The creation and utilization of an e-clearinghouse in accordance with the present invention serves the interest of various people involved in the business: (1) owners of collectible objects are able to create a database of all of their collectibles, where the database is maintained by an independent third party. The ability to store detailed information about each object and then quickly verify the authenticity of a particular collectible is considered to add to its "retail" value in the marketplace. The ability to collect and maintain detailed information (including physical location) of all collectible objects associated with a particular owner may also be useful for insurance purposes; (2) purchasers of collectible objects now have an additional degree of security that they are purchasing an authentic collectible—various ways that "fakes" have heretofore been offered for sale in the marketplace are significantly reduced by the ability to double-check the collectible object against a database record (via the unclonable RFID tag), with the additional ability to verify the image of the item being evaluated against the images stored in the database; and (3) providers of the e-clearinghouse system, where this is considered as a new type of business offering, including the capability of franchising the process of creating the unclonable RFID tags and accessing the e-clearinghouse to store the data associated with collectible object.

In accordance with a specific embodiment well-suited for use with large collectible objects (e.g., cars, furniture, paintings, etc., as mentioned above) an RFID tag is created that includes a transparent "window" through which a specific, unique portion of the large collectible object is viewed. The RFID tag is affixed to the large collectible object at a predetermined location (preferably, an unobtrusive location, such as on an underside of inside of an object), where the portion of the object visible through the window is digitized and stored in the manner described above, creating a unique recording in the e-clearinghouse for this object. Inasmuch as virtually every object is different in various, minute ways, the created digital image will be unique to that collectible object.

Other and further advantages and features of the present invention will become apparent during the course of the following discussion and by reference to the accompanying drawings.

BRIEF DESCRIPTION OF THE DRAWINGS

Referring now to the drawings,

FIG. 1 contains a high level diagram of the verification system of the present invention;

FIG. 2 is a flowchart illustrating an exemplary process of creating an unclonable RFID tag for a collectible object in accordance with the present invention;

FIG. 3 is an exemplary database record associated with a collectible object;

DETAILED DESCRIPTION

Figure 4:
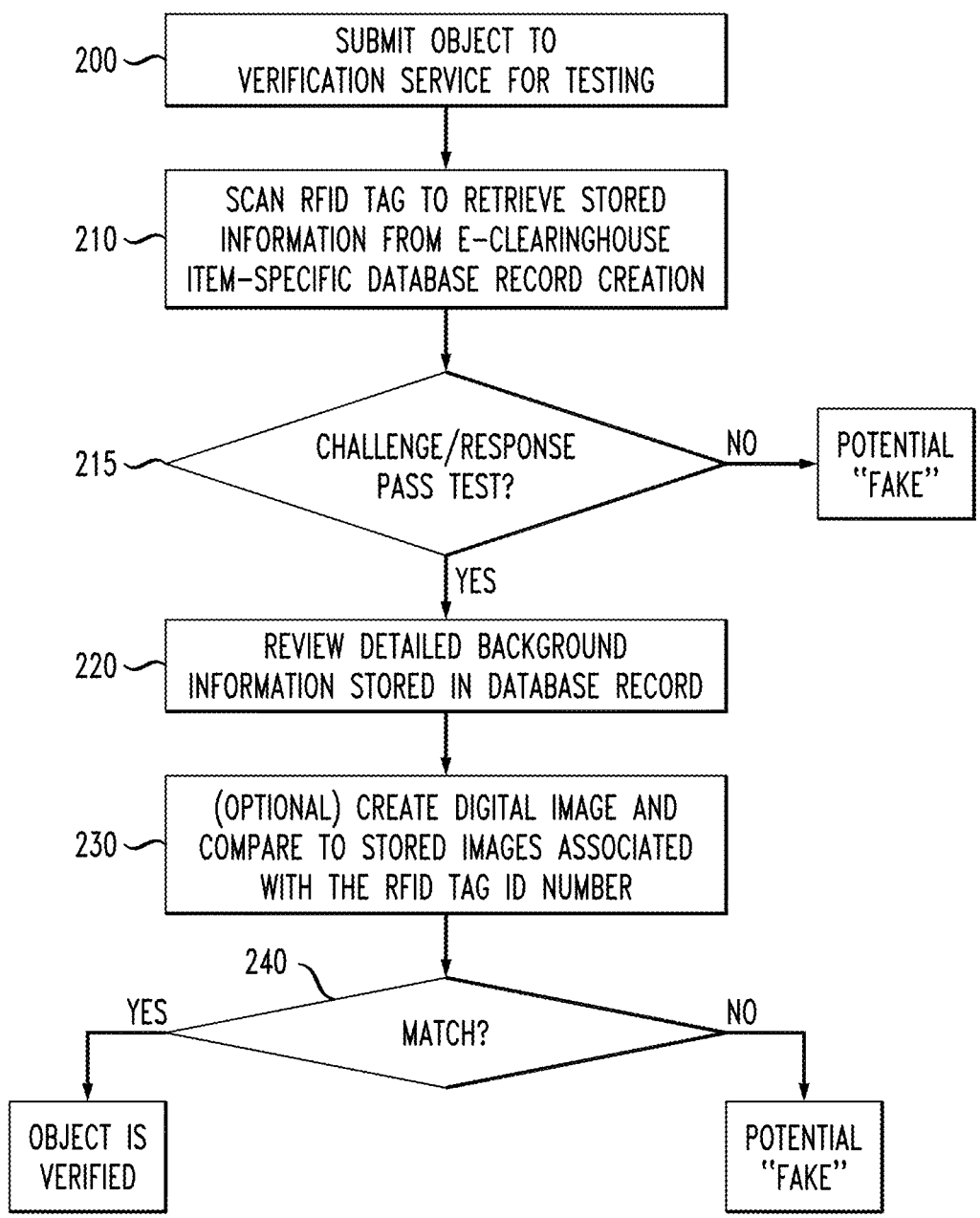
FIG. 4 is a flowchart illustrating an exemplary process of verifying a collectible object in accordance with the present invention.

In accordance with the present invention, a verification system for collectible objects is proposed. The system includes a centralized e-clearinghouse operation that allows for the owner of a collectible object to store information associated with the collectible object in a third-party monitored and secured database. An unclonable RFID tag (i.e., a "secure" RFID tag) is affixed to, or otherwise physically associated with, the collectible object and is utilized to permit access to the collectible object's stored information. As will be described in detail below, this stored information (hereinafter referred to as "detailed background information") may include items such as the pedigree of the collectible object, third-party appraisal documents, appraisal-suggested price, condition rating, pricing and the like. The provision of a secure linkage between an unclonable RFID tag affixed to a collectible object and a database record associated with that object allows for a passive RFID tag so be used, while also providing a wealth of information (via the database access) to a prospective purchaser.

The present invention is also directed to a method of creating an unclonable RFID tag and associated database record for each collectible object in the first instance, and thereafter using the unclonable RFID tag to support a sales transaction by allowing a prospective purchaser to access and review the detailed background information stored in the database at the e-clearinghouse.

It is a key feature of the present invention that the unclonable RFID tag is used to control access to the stored information, maintaining the integrity of the system and thus assuring prospective purchasers of a collectible object of the authenticity of the object. The RFID tag itself holds only a limited amount of information (such as the identity of the owner and, perhaps, the value of the object) and can therefore be formed as a passive RFID tag (as opposed to a more expensive active RFID tag).

It is a significant aspect of the present invention that the verification system remains in control of the specific process used to create the specific data items stored in association with the object (owner, pedigree, transaction history, noted physical location and the like, referred to collectively as "detailed background information") in the e-clearinghouse database. The object's unclonable RFID tag is "locked" and at least one challenge/response pair is stored in the database in the manner described above such that the specific database information is thereafter only accessible by an "object" database query using the challenge/response from the object's unclonable RFID tag. Preferably, multiple challenge/response pairs are used.

When a prospective buyer wishes to verify the "identity" of a collectible object prior to purchase, the specific, unclonable and locked RFID tag is read and the item-specific publicly-available information reviewed. As mentioned above, only a limited amount of information is stored on the RFID tag itself (such as the identity of the owner and the "value" of the collectible). If the owner information stored on the RFID tag doesn't match the information associated with the prospective seller, the "buyer" is warned and can decline to move forward with the purchase. If the tag-based information matches, the process continues by accessing the information stored in the database (using the RFID tag to gain access to the database). This information can then be studied in depth and if everything matches, the "buyer" then has assurance that the object is indeed what the seller alleges it to be, and its worth is verified by both the brief data contained on the tag and the in-depth information stored in the e-clearinghouse database. As mentioned above, the RFID tag need only store a minimal amount of information—and can take the preferable form of a passive, "smart" unclonable RFID tag—since the more sensitive, detailed information is stored (and "locked") in the associated record in the e-clearinghouse database.

At the owner's discretion, a series of digital images of the object itself may also be created and stored in the database and also linked with the unclonable RFID tag, allowing for further authentication using a comparison of a digitized image of the item to a stored digitized image in the database. In this case, one or more digital photographs of the object needs to be taken by an agent of the verification service, under the same conditions used by the verification system to initially create the multiple images of the authenticated object and stored in the e-clearinghouse database record. The just-taken image(s) is/are then sent to the verification system website, with the "challenge/response" procedure associated with the unclonable RFID tag used to access the specific database record, allowing for the just-taken image(s) to be digitally compared with the stored images using a comparison software program. If there is no match, the object is flagged as a potential "fake" and the prospective buyer is suitably warned. Presuming that the current digital images match the stored digital image/photo, the prospective buyer can then be doubly certain of the object's authenticity, having both the unclonable RFID challenge/response and the associated database-stored information (pedigree, appraisal, digital image, etc.).

FIG. 1 contains an architecture of the RFID tag-based verification system 10 of the present invention. As described above, system 10 utilizes an e-clearinghouse 12 that stores information associated with collectible objects that are owned by various individuals (or businesses) that subscribe to the verification service. In the illustration of FIG. 1, a plurality of database records 14-A is shown as associated with a first owner (defined as Owner A), where each separate record 14-A1, 14-A2, . . . 14-AN is associated with a different collectible object belonging to Owner A. A second plurality of database records 14-B is shown, and associated with a different entity, defined as Owner B. It is an aspect of the arrangement of the present invention that records 14-A and records 14-B are stored in different partitions within the database structure, where owner A cannot access database records 14-B and, similarly, owner B cannot access database records 14-A.

Using a process that will be described in detail in association with the flowchart of FIG. 2, each collectible object $18_x$ is processed to include an unclonable RFID tag $20_x$. In the system as shown in FIG. 1, a set of three exemplary collectible objects is shown, identified as $18_1$, $18_2$ and $18_3$, each having its own unique, unclonable RFID tag $20_1$, $20_2$ and $20_3$, respectively. In this case, it is shown that unclonable RFID tag $20_1$ is linked with database record 14-B1; thus, it is presumed that collectible object $18_1$ is associated with owner B. As described above and discussed in detail below, when owner B wishes to sell collectible object $18_1$, associated unclonable RFID tag $20_1$ is used to access database record 14-B1 to verify the authenticity of the collectible object.

FIG. 2 contains a flowchart illustrating an exemplary process that is used to create a verification record 14 for a collectible object 18 in the first instance. It is presumed that an initial record is desired to be created by the owner of the object so that a future sale transaction may be simplified by allowing a potential buyer to access the information stored in e-clearinghouse 12 and thus verify that the collectible object "in hand" matches the data stored in its record.

Referring to FIG. 2, the initial process of creating a database entry for the object begins with the owner presenting the physical object (i.e., rare coin, sport memorabilia, artwork, rare book, etc.) to the verification service (step 100) and also presenting documentation to the verification service regarding the authenticity and 'worth' of the object. It is to be noted that the service itself is not providing any additional assessment of the object; the documentation will be presumed to be valid. In the case of a coin, a 'grade' may be associated with the coin based upon industry agreed-upon standards (and/or a separate third party appraisal). For the purposes of the following discussion, it will be presumed that the collectible object is a coin; this is to be understood as exemplary only and for the purpose of clarifying the various aspects of the verification service of the present invention.

In one implementation, the specific authenticity documents and collectible object are directly submitted to the verification service. Alternatively, the verification service may employ one or more authorized dealers (franchisers) and an owner may take the collectible object (and associated documentation information) to one of the authorized franchise locations. In either case, the same process as discussed in association with FIG. 2 is used to create the database record and associate an unclonable RFID tag with the collectible object.

The process continues with the creation of a database record 14 for the object 18 (step 110), the record including identification information associated with the owner of the object, a description of the object, its assessed value/grade, provenance information (if any), and pedigree information (if any). Collectively, the stored information as defined as "detailed background information". At least one challenge/response pair is collected from a to-be-associated unclonable RFID tag 20 and also stored in database record 14 for later use in allowing/denying access to the record (step 115). Preferably, multiple challenge/response pairs are used for increased security. An exemplary record 14 is shown in FIG. 3.

As an optional step (shown in dotted line form as step 120), one or more digital images of the collectible object are created and also stored in the database record. For the sake of reproducibility and later operations associated with comparing digital images, a standardized process is used by the verification service to create the digital images. In particular, the object can be positioned on a registration chart (for example, an HSB/RGB standard sheet) in a predefined manner, with the lighting, focus and reflectivity of the process all being predetermined. A set of images of the object is then created, associated with a number of pre-defined views of the object, and stored as part of the detailed background information in the proper database record.

An unclonable RFID tag 20 is then created for the object (step 130), with the RFID tag's unique responses (linked with the individual object's RFID tag challenges) stored in the e-clearinghouse item's specific database record, as discussed above. In this way, the system ensures the linkage to and authenticity of the item's information. Unclonable RFID tag 20, the collectible object's stored detailed background information (appraisal, pedigree, etc.) and the above-mentioned method of "in the field" digital photo comparison all work to give the buyer a high degree of comfort when purchasing an item.

An "unclonable" RFID tag, for the purposes of the present invention, is a secure, encrypted RFID tag—an integrated circuit device whose stored information is not able to be copied, duplicated or altered. One methodology for providing this feature is based on "physical unclonable functions" (PUF) technology and utilizes tiny electrical circuit primitives that exploit the unavoidable process variations in integrated circuit fabrication to generate an unlimited number of unique and unpredictable (although reliable) "secrets" for each manufactured RFID chip. These secrets are dynamically generated using a "challenge/response" scheme. When employed within an RFID tag, a PUF is queried with a "challenge" from an external RFID interrogator unit and/or from the challenges stored in a database (the 'challenge' taking the form of a random 64-bit (or longer) number) and generates a unique response (again, a 64-bit number), defined as its "digital signature". If and only if the response matches the challenge is the 'interrogator' able to access the information stored on the RFID tag (and/or the associated record in the database). For an additional level of security, multiple challenge/response pairs can be associated with a single RFID tag. Since it is impossible to model or duplicate the integrated circuit (IC) fabrication process variations (even for the same manufacturer), it is impossible to generate the same challenge/response pairs for different ICs (i.e., for different RFID tags). Thus, each RFID tag is truly unique (hereinafter referred to as "unclonable").

Once unclonable RFID tag 20 has been created, it is "locked" and affixed to collectible object 18 (step 140). Collectible object 18, now defined as unclonably tagged, is returned to the owner (step 150). The owner can then look at the item's e-clearinghouse record at any time by scanning the RFID tag with an appropriate RFID reader connected to an internet-linked computer. As an option, login and password information may be required for the owner to gain access to the item's database record retained by the verification service (if, indeed, the owner of the object is permitted access to the database using outside access "read only" mode). This access is considered to be at the discretion of the service provider and, in fact, can be considered on a case-by-case basis as a function of the degree of 'trust' between the service provider and the owner of the collectible object.

It is to be understood that the unclonable RFID tag may be disposed in a "mounting" that also houses the collectible object, or directly affixed to the object itself. In the latter case, it is preferred that an adhesive be used that will not leave a residue on the object, which may otherwise diminish the value of the collectible object. It is also preferable that the unclonable RFID tag be created as a 'tamper-proof' tag so that if it becomes separated from the object, the tag will be disabled. This feature is thought to greatly diminish the ability of unscrupulous dealers from 'switching tags' on their merchandise.

It is a significant benefit and advantage of the verification service of the present invention that the act of 'tagging' collectible objects in this manner allows for the owner of multiple objects to better control his inventory, by virtue of being able to maintain information on the current location of each object in the e-clearinghouse database record. This is especially useful for collectible dealers who often have more than one physical location where their objects are stored. The ability to provide a listing of all collectibles in this manner—as maintained by an independent third party (the verification service)—may be useful should an insurance claim ever need to be filed.

As mentioned above, a significant value of the verification service of the present invention is recognized during a sales transaction. A prospective purchaser is initially able to access the "public information" available on the associated unclonable RFID tag 20 to confirm that the owner listed on the tag is indeed the entity offering the object for sale. The assessed value/grade of the object may also be accessed from the unclonable RFID tag itself. If there are any questions at this point, the prospective purchaser can walk away from the transaction. Presuming this information is consistent, the prospective purchaser can present the object to the verification service (presuming that the service has multiple locations in many different areas around the world) and access the detailed background information that is stored in the associated database record 14 and confirm the authenticity of the collectible object. Preferably, the owner has stored a plurality of digital images of the object and the prospective purchaser can create a similar set of images and have the verification system compare the newly-created images against those stored in database.

FIG. 4 contains a flowchart of an exemplary process used by a prospective purchase to verify the authenticity of a collectible object. As shown, the process begins with the presentation of an object 18 to the verification service (step 200). The unclonable RFID tag 20 associated with the presented object 18 is then "read" by an RFID reader and used to gain access to the proper database record 14 (step 210). At this point, the challenge/response process is used (step 215), where if the proper 'response' is not forthcoming, the RFID tag is flagged as being fraudulent and the prospective purchaser cannot gain any further access to the system. The prospective purchaser can then decline to go forward with the transaction.

Figure 5:
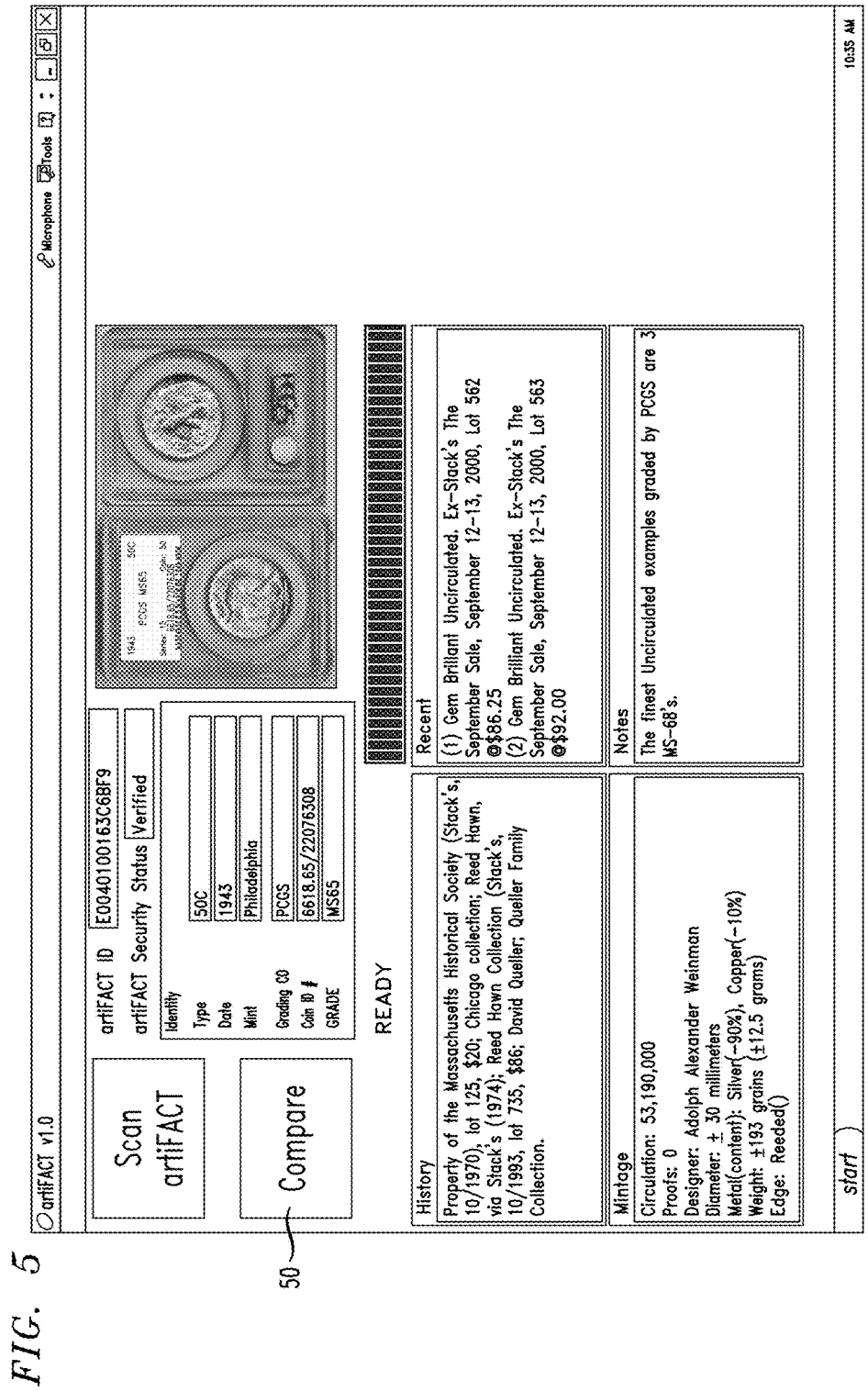
FIG. 5 is a screen shot of exemplary detailed background information stored in a database record for a collectible object in accordance with the present invention.

Presuming the challenge/response process is successful, the information stored in database record 14 associated with that object then becomes available for review (step 220). FIG. 5 is a screen shot of an exemplary record 14. As shown, detailed background information such as "history", "recent events", and the like are then all available for review by the prospective purchaser.

Figure 6:
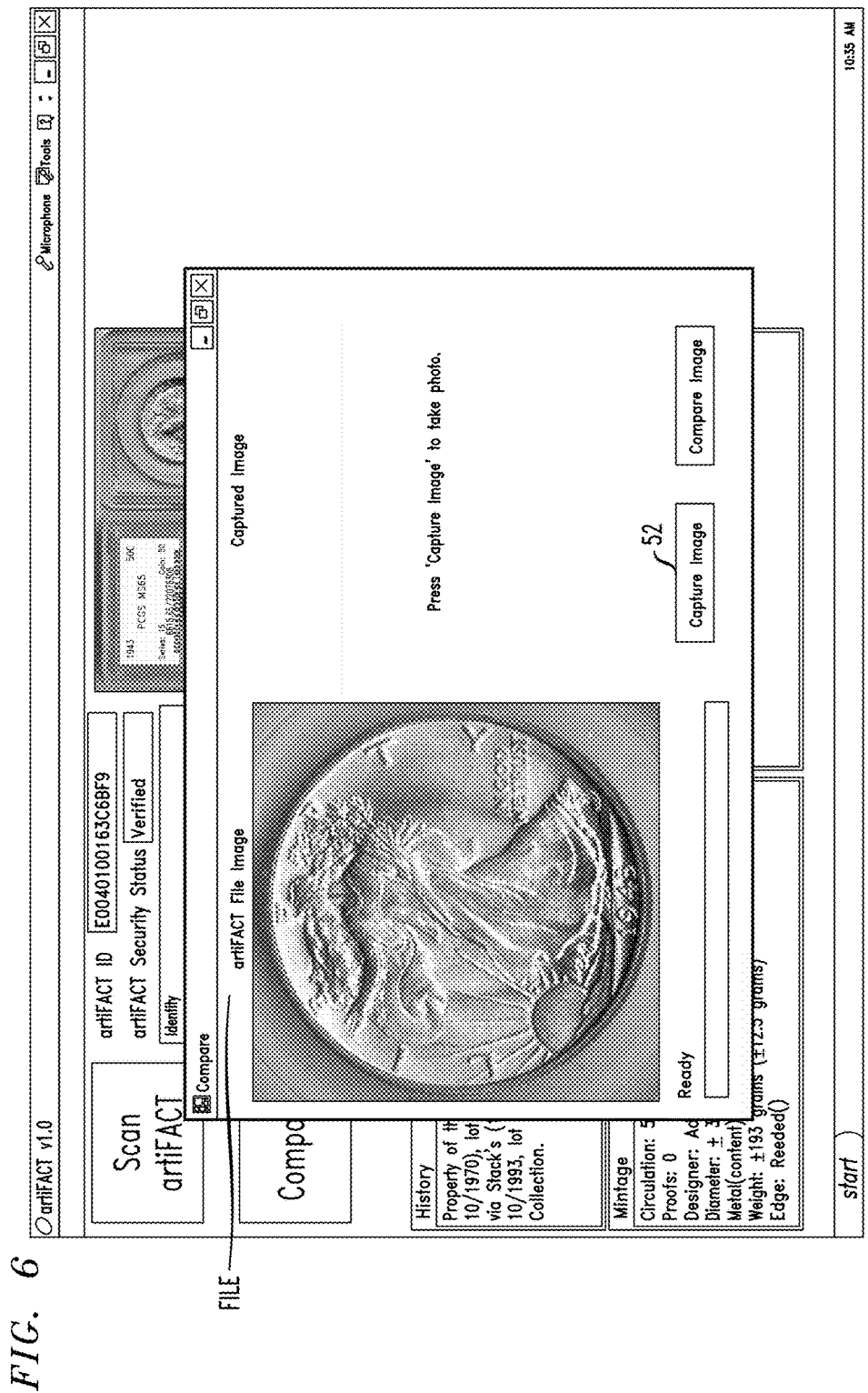
FIG. 6 is a screen shot showing an exemplary digital image stored in a database record in accordance with the present invention.

In a preferred embodiment of the present invention, the prospective purchase is further able to compare digital images of the object-in-hand to a set of digital images stored in the database. This is considered as "optional", and is shown as step 230 in the flowchart of FIG. 4. Referring to FIG. 5, a 'compare' button 50 on the GUI being viewed by the prospective purchaser can be used to initiate this process. Presuming that the 'compare' process has been activated, the screen shown in FIG. 6 will appear, showing an image stored in the database. The process continues by clicking on the "capture image" button 52 on this page. In order to properly capture an image and perform a valid comparison, it is important that the recording conditions be well-controlled.

Figure 7:
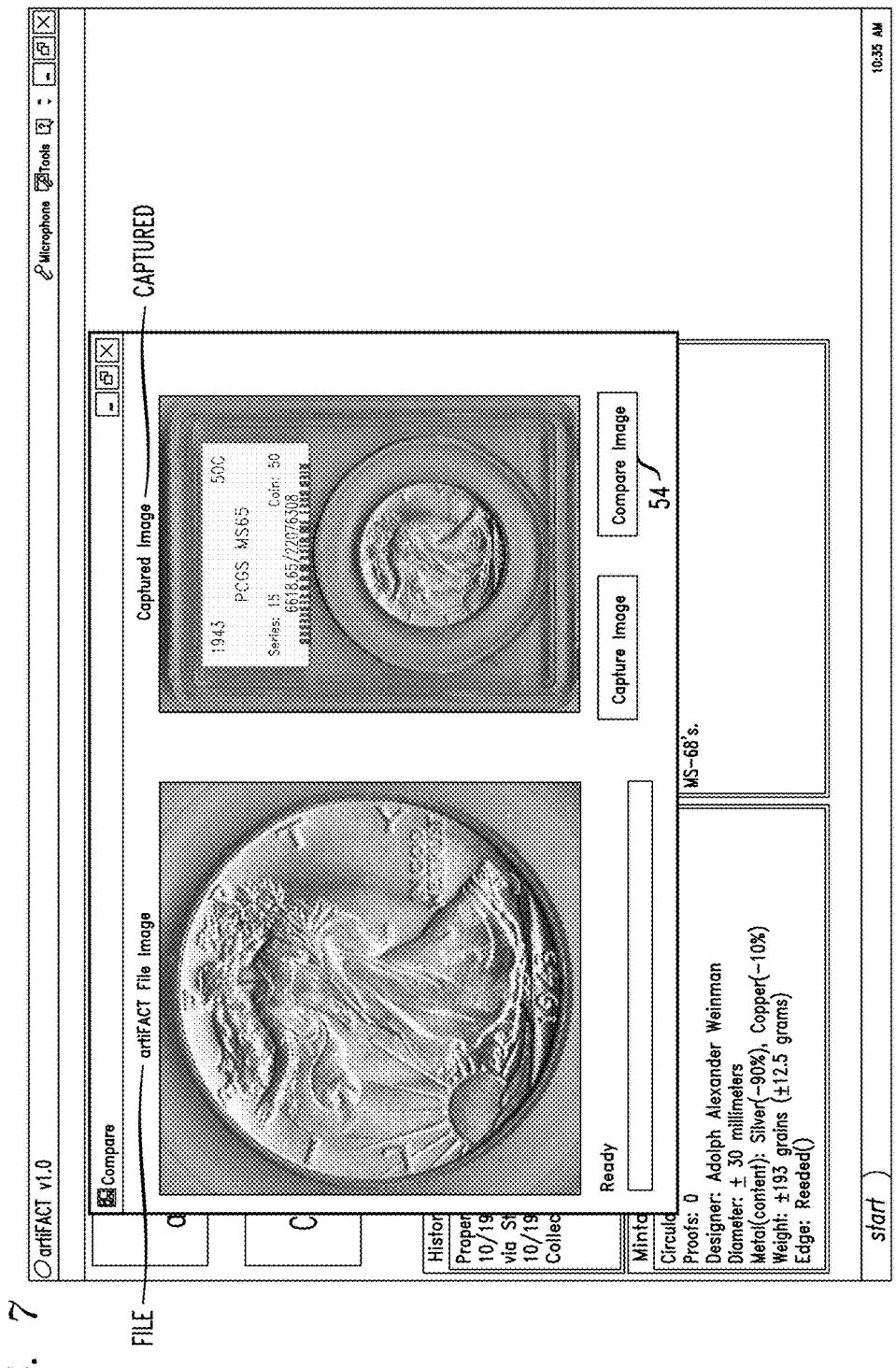
FIG. 7 is a screen shot showing both the "file" and "captured" digital images of a collectible object.
Figure 8:
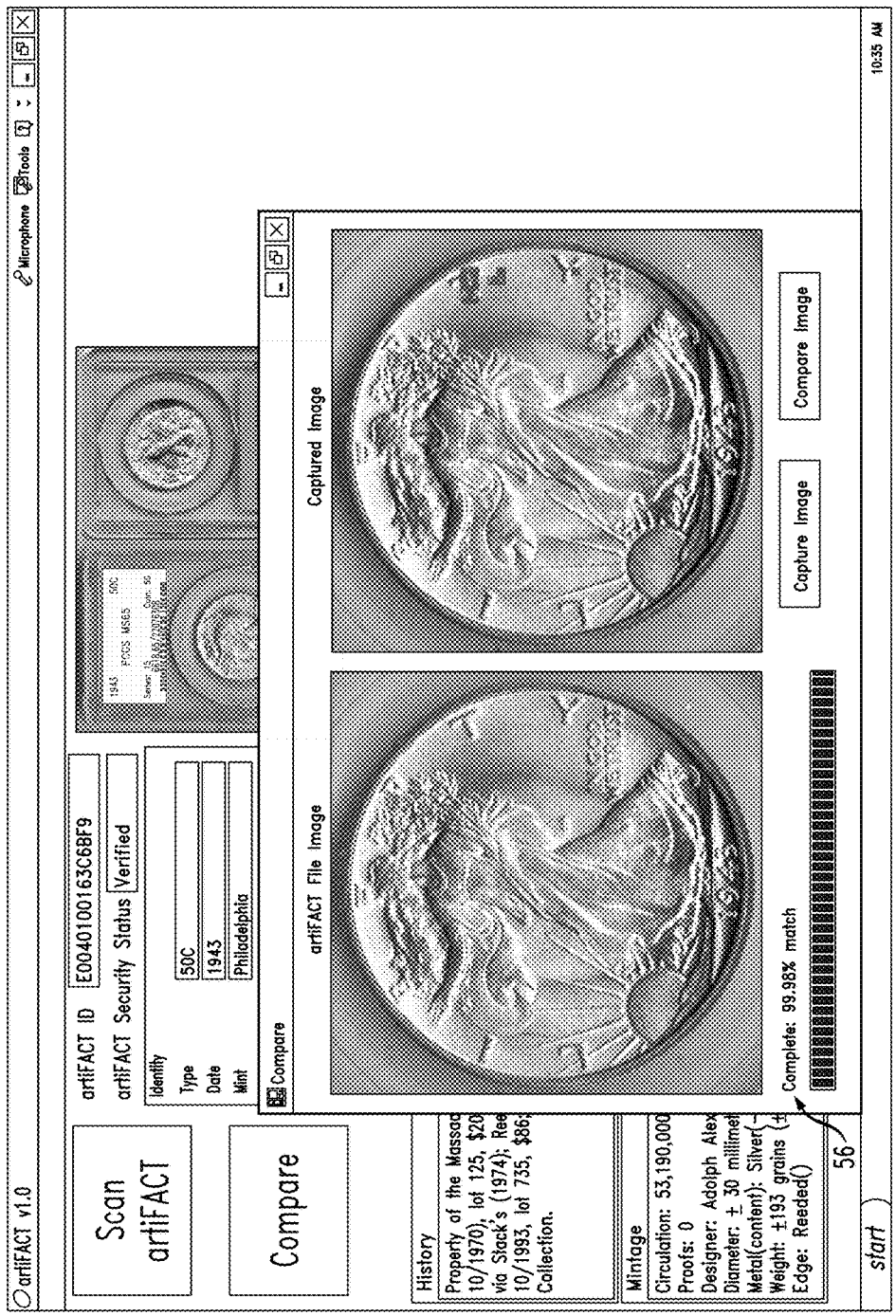
FIG. 8 is a screen shot created as a result of performing a comparison of the "file" and "captured" digital images.

To that end, the object the object is positioned on the same type of registration chart as used in the process of creating a database record in the first instance. Continuing with the process, a digital image is generated. FIG. 7 is a screen shot showing a side-by-side view of a file image of an object (denoted "file" in FIG. 7) and a current image of an object being studied (denoted "captured" in FIG. 7). A comparison of the new digital image to the stored image is then performed (step 240) by clicking on "compare image" button 54. Any suitable computer program for providing image comparison and verification may be used in accordance with the present invention. FIG. 8 illustrates the results of the comparison, indicating a 99.98% "match" in field 56. If the comparison is successful, the prospective purchaser receives affirmation that that the object is indeed genuine (step 240). Otherwise, if the digital images do not match, the prospective purchaser is warned that the object may be a fake (step 250).

Presuming the transaction is then completed, the database record is updated to remove that object from the original owner's listed. Preferably, the new owner will desire to maintain a registration with the system, and the RFID tag number and other data are then linked to the identity of the new owner.

While the method and process as described above addresses many of the concerns of the prior art, there is a continuing concern with respect to the ability to catalogue and verify the authenticity of relatively large collectible items—items such as cars, paintings, furniture, pottery, china, and the like—where it is not possible (or, at least, practical) to store complete digital images of the object in the manner that can be accomplished with coins and other small collectibles.

Figure 9:
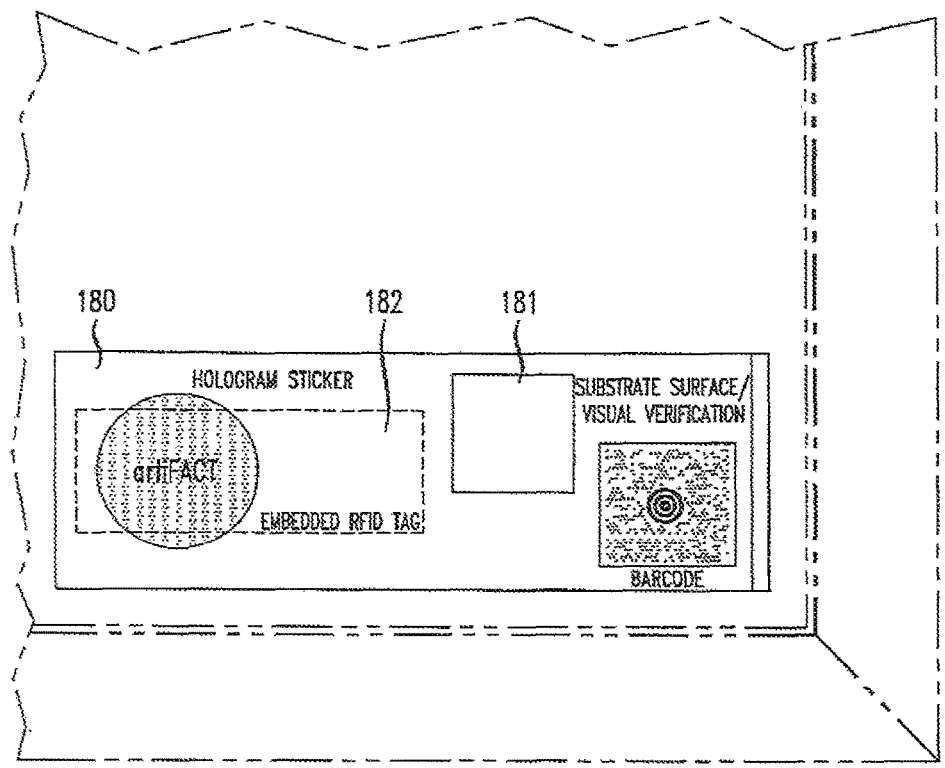
FIG. 9 is a top view of an exemplary "large object" RFID tagging label that may be used in association with relatively large sized collectible objects in accordance with the present invention, in this case shown with a portion of a painting in phantom view.

Thus, in accordance with another aspect of the present invention, an RFID tagging label has been developed to meet this need. An exemplary RFID tagging label 180 is illustrated in FIG. 9. In accordance with this embodiment of the present invention, RFID tagging label 180 is formed to have an adhesive back surface so that it can be affixed to a large collectible object (such as, for example, a painting—as shown in phantom in FIG. 9). Importantly, RFID tagging label 180 includes a transparent window 181 through which a portion of the collectible object is visible. Preferably, this "window" is on the order of 0.5"×0.5" square, although of course other dimensions can be used. Indeed, it is also possible to include more than one transparent window in an RFID tagging label, where perhaps a set of four windows are formed at the four corners of the RFID tagging label. In general, any suitable number of transparent windows may be included. Preferably, RFID tagging label 180 is affixed in an unobtrusive location (for example, on the back of a painting, in the case as shown in FIG. 9).

In accordance with the present invention, RFID tagging label 180 also includes an embedded, unclonable RFID tag 182, formed in the same manner as unclonable RFID tag 20 discussed in detail above, with tag 182 containing similar challenge/response information.

It has been found that even such a small sample size of an item will have unique, identifying attributes so that the creation of a digital image of only a small portion of an object will function as, so to speak, a "fingerprint", providing unique characteristics that may later be used to verify the authenticity of an object. Thus, by creating and storing digital images of the portions visible through the transparent window (or windows), a verifiable record of authenticity can be formed.

Figure 10:
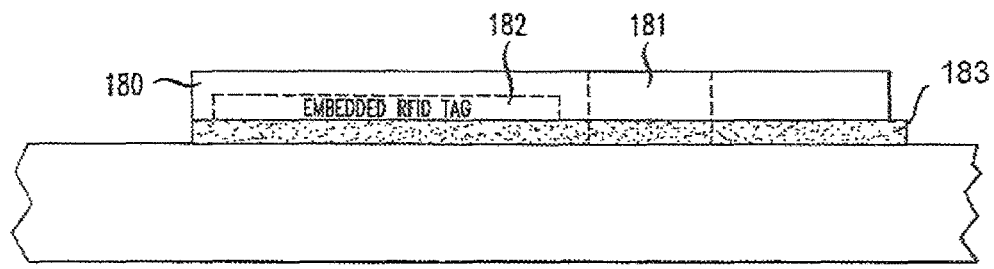
FIG. 10 is a side view of the RFID tagging label of FIG. 9.

Similar to the process described above, a digital image is created of the portion of the large collectible object that is visible through window 181, where this digital image information is stored along with the other relevant information regarding the object, in the appropriate records 14 of the owner within e-clearinghouse 12. Importantly, RFID tagging label 180 is formed as a tamper-proof element, so that if an individual attempts to remove label 180 from the collectible object, the stored information is destroyed. FIG. 10 is a side view of RFID tagging label 180 (and a phantom portion of a large collectible object, such as a painting), showing the location of window 181, unclonable RFID tag 182, as well as an adhesive layer 183 that is utilized to affix RFID tagging label 180 to the collectible object. Preferably, adhesive layer 183 is configured to "disarm" RFID tagging label 180 should it be tampered with by unauthorized individuals.

By affixing RFID tagging label to a "large" collectible object in an unobtrusive location (yet, a location where a digital image can be created), it is possible to track, catalogue and verify these collectibles in the same manner as described above.

The foregoing description of the RFID-based verification system has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional embodiments. It is intended that the scope of the invention be limited not by this detailed description, but rather by the claims appended hereto.

What is claimed is:

1. A computer-implemented system comprising:
an electronic clearinghouse comprising a database, the database comprising a plurality of records associated with a plurality of collectible objects in a one-to-one relationship, wherein the collectible objects are physical objects, wherein a subset of the plurality of records are associated with an owner of the associated collectible objects, wherein each record comprises owner-provided detailed background information comprising unique security information and at least one digital image of a portion of the associated collectible object, wherein the unique security information controls database access to the collectible object associated with the record;
a plurality of unclonable passive RFID tags associated with the plurality of collectible objects in a one-to-one relationship in the database, wherein each unclonable passive RFID tag comprises the unique security information associated with the record for the associated collectible object, wherein at least one unclonable passive RFID tag is embedded in an RFID tagging label comprising an adhesive back surface for affixation to one of the plurality of collectible objects and at least one transparent window through which a portion of the one of the plurality of collectible objects is visible, wherein the at least one digital image of a portion of the associated collectible object stored in the record associated with the collectible object is the portion visible through the at least one transparent window.

2. The computer-implemented system of claim 1, wherein the RFID tagging label is tamper-proof such that the unique security information of the unclonable passive RFID tag is destroyed when the RFID tagging label is removed from the collectible object.

3. The computer-implemented system of claim 1, wherein the at least one transparent window comprises a plurality of transparent windows.

4. The computer-implemented system of claim 1, wherein the at least one transparent window comprises a single transparent window.

5. A computer-implemented method comprising:
  receiving, in an electronic clearinghouse comprising a database, data for a plurality of collectible objects, wherein the collectible objects are physical objects;
  creating a plurality of database records from the received data;
  associating the plurality of records with the plurality of collectible objects in a one-to-one relationship, wherein a subset of the plurality of records are associated with an owner of the associated collectible objects, wherein each record comprises owner-provided detailed background information comprising unique security information and at least one digital image of a portion of the associated collectible object, wherein the unique security information controls database access to the collectible object associated with the record;
  associating a plurality of unclonable passive RFID tags with the plurality of collectible objects in a one-to-one relationship in the database, wherein each unclonable passive RFID tag comprises the unique security information associated with the record for the associated collectible object;
  forming an RFID tagging label, wherein the RFID tagging label comprises an adhesive back surface for affixation to one of the plurality of collectible objects and at least one transparent window through which a portion of the one of the plurality of collectible objects is visible, wherein the at least one digital image of a portion of the associated collectible object stored in the record associated with the collectible object is the portion visible through the at least one transparent window; and
  embedding at least one unclonable passive RFID tag in the RFID tagging label.

6. The computer-implemented method of claim 5, wherein the RFID tagging label is tamper-proof such that the unique security information of the unclonable passive RFID tag is destroyed when the RFID tagging label is removed from the collectible object.

7. The computer-implemented method of claim 5, wherein the at least one transparent window comprises a plurality of transparent windows.

8. The computer-implemented method of claim 5, wherein the at least one transparent window comprises a single transparent window.

* * * * *